United States Patent [19]

Kagata

[11] 4,163,486
[45] Aug. 7, 1979

[54] FREE WHEEL HUB

[75] Inventor: Tooru Kagata, Takoaka, Japan

[73] Assignee: Aisin Seiki Kabushiki Kaisha, Aichi, Japan

[21] Appl. No.: 927,911

[22] Filed: Jul. 25, 1978

[30] Foreign Application Priority Data

Jul. 27, 1977 [JP] Japan .................................. 52-90630

[51] Int. Cl.² ............................................. F16D 13/04
[52] U.S. Cl. .................................... 192/35; 192/67 R; 403/1; 403/359
[58] Field of Search ...................... 403/1, 359; 192/35, 192/36, 67 R; 180/42, 49

[56] References Cited

U.S. PATENT DOCUMENTS

| | | | |
|---|---|---|---|
| 3,314,510 | 4/1967 | Zlotek | 192/35 X |
| 3,765,521 | 10/1973 | Kagata | 192/35 |
| 3,788,435 | 1/1974 | Prueter | 192/35 |
| 4,043,226 | 8/1977 | Buuck | 180/42 X |

*Primary Examiner*—Wayne L. Shedd
*Attorney, Agent, or Firm*—Oblon, Fisher, Spivak, McClelland & Maier

[57] ABSTRACT

A free wheel hub device made up of a main body secured to a wheel; an inner race secured to a wheel axle and rotatably supporting the main body at its outer periphery; a toothed wheel axially mounted on the inner race and having a cam face and outer teeth engageable with inner teeth of the main body; a spring located between the inner race and the toothed wheel; a support member secured to the wheel axle tube and connected to the axle; and a shoe located between the toothed wheel and the support member, and having a cam face engageable with that of the toothed wheel. The shoe is rotatable on a guide surface of the support member so that, upon engagement of the cam faces, the outer teeth of the toothed wheel engage with the inner teeth of the main body, against the force of the spring, to slidably rotate the shoe upon the guide surface of the support member.

4 Claims, 5 Drawing Figures

FREE WHEEL HUB

BACKGROUND OF THE INVENTION

1. Field of the Invention

This invention relates to free wheel hub mechanisms disposed between axle and wheels (normally between front axle and front wheels) for selectively connecting or disconnecting them in accordance with the torque transmitting conditions of the vehicle.

2. Description of the Prior Art

The prior art lacked a free wheel hub which can accurately shift from two-wheel drive to four-wheel drive depending upon the rotational or non-rotational condition of the wheel axle.

SUMMARY OF THE INVENTION

It is an object of this invention that in the rotational condition of the wheel axle, it accurately transmits torque from the wheel axle to a wheel through the free wheel hub device of the invention.

It is a further object that in the non-rotational condition of the wheel axle, it accurately prevents the wheel axle from rotation with the wheel.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

Figure 1:
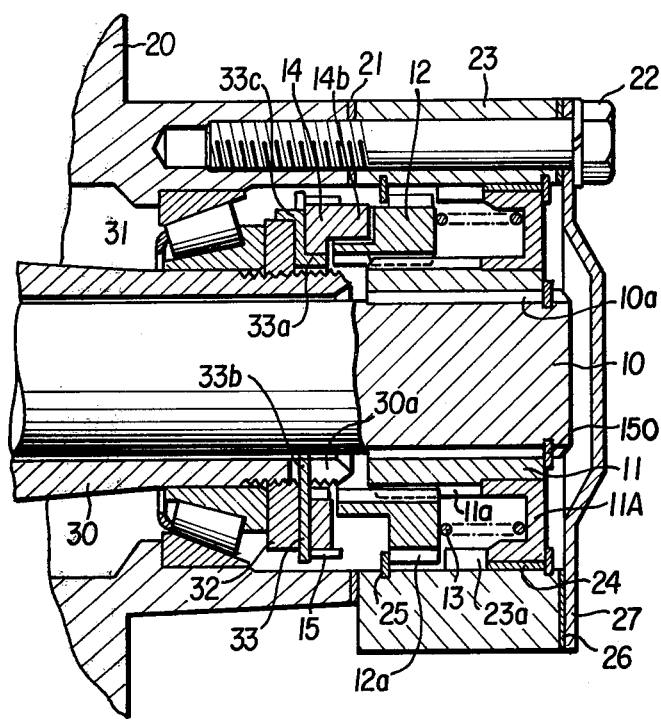
FIG. 1 is a vertical sectional view of the first embodiment.
Figure 2:
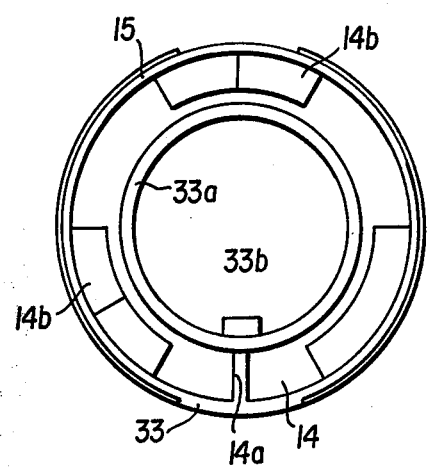
FIG. 2 is a front view of FIG. 1 but showing a preassembled condition of elements 14, 15 and 33.

In FIG. 1, an axle 10 is inserted into an axle tube 30 and is provided with a spline 10a at an outward end (right end of FIG. 1). The inward end of the axle is operatively connected to a differential device (not shown) through a universal joint (not shown, either). The differential device is further connected to a transmission (not shown) through a device for converting the vehicle from four-wheel drive to two-wheel drive or vice versa.

A wheel hub 20 is rotatably mounted on the axle tube 30 by means of bearing means 31 and is further operatively connected to the axle 10 through a free wheel hub device for transmitting torque thereto. The bearing means 31 is adjustably disposed between the hub 20 and the tube 30 by nut 32. The free wheel hub device generally includes an inner race 11 splined to the axle 10, a main body 23 secured to the wheel hub 20 through gasket 21 and bolt 22, a toothed wheel 12 disposed between the inner race 11 and the main body 23, and a shoe 14.

The inner race 11 is prevented from rightward or outward projection by a clip 150. The inner race 11 is further provided with a spline portion 11a at a part of the outer peripheral portion thereof for engaging with the toothed wheel 12. A ring-shaped or annular retainer 11A is fixedly secured on the remaining part of the outer peripheral portion of the inner race 11.

The main body 23 is supported on the retainer 11A through a metal bearing 24 which is pressurizedly interposed between the main body 23 and the retainer 11A. The main body 23 is provided with a spline 23a at the inside wall thereof for engaging with a spline 12a of the toothed wheel 12. A cover member 27 is secured to the main body 23 by the bolt 22 threaded into the main body 23 as well as the wheel hub 20. Thus the free wheel hub device is protected by the cover 27.

The toothed wheel 12 has a stepped portion at the outer periphery and, at the large diameter portion thereof, is provided the spline 12a which is engageable with the spline 23a of the main body 23 upon axial movement of the wheel 12. The toothed wheel 12 is axially movably mounted on the spline 11a of the inner race 11 and is biased toward left as viewed in FIG. 1 by a coil spring 13 supported on the retainer 11A.

A clip 25 is provided on the main body 23 for preventing excess leftward movement of the toothed wheel 12.

Figure 3:
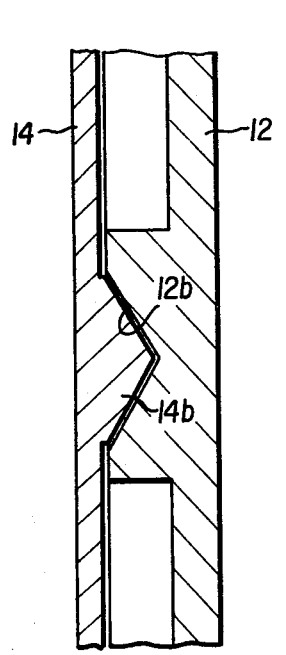
FIG. 3 is a spreaded view cam faces of toothed wheel and shoe.
Figure 4:
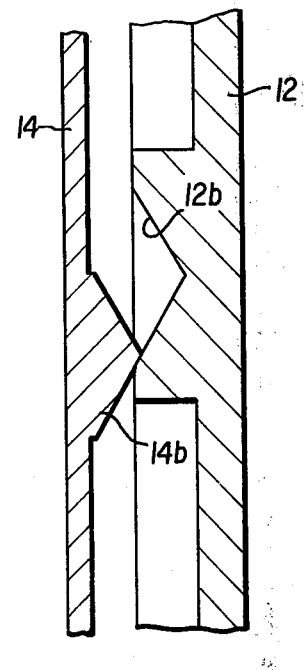
FIG. 4 is similar to FIG. 3 but showing cam acting condition.

At the stepped portion of the toothed wheel 12 is provided a V-shaped cam face 12b which is shown in FIGS. 3 and 4 in a spread fashion. The shoe 14 has complementary shaped cams 14b which move the toothed wheel 12 to the right by engaging with the cam face 12b of the wheel 12.

The shoe 14 further has a slit 14a which is biased in the inner direction by a spring band 15. A support member 33 is secured on the axle tube 30 and has a boss 33a, with which the shoe 14 is slidably in contact under pressure.

The support member 33 is provided with a pawl 33b which is disposed in an axial groove 30a of the axle tube 30. The pawl 33b has an axially bent portion 33c for restricting the rotatable movement of the nut 32.

In assembly, first the wheel hub 20 is mounted on the axle tube 30 by means of bearing 31. Thereafter the nut 32 is threaded on the axle tube 30 to thereby adjust the position of the bearing 31. Next, the support member 33, on which the shoe 14 and spring band 15 have been pre-assembled, is mounted on the axle tube 30 by fitting the pawl 33b of the support member 33 into the axial groove 30a of the tube 30, and thereafter the bent portion 33c of the pawl 33b is engaged with the outer periphery of the nut 32. Finally, the preassembled elements comprising the inner race 11, toothed wheel 12, main body 23, etc., are splined to the wheel axle 10 by engaging the inner race 11 with the spline 10a of the axle 10 and thereafter the main body 23 is secured to the wheel hub 20 by means of bolt 22.

In operation, when the vehicle is under two-wheel drive condition, the wheel axle 10 has no torque received from the transmission. Therefore, the inner race 11 has no rotational torque, which will not rotate the toothed wheel 12. The toothed wheel 12 is accordingly biased to the left (as viewed in FIG. 1) by the spring 13 to maintain the non-engaging condition between the two splines 12a and 23a. Thus, the main body 23 and wheel hub 20 are freely rotatable through bearing means 31 and 24.

When the vehicle is converted to four-wheel drive condition, the wheel axle 10 is rotated to rotate the toothed wheel 12 and the inner race 11. Due to the rotation of the toothed wheel 12, the cam face 12b thereof is actuated by the complementary cams 14b of the shoe 14, which will cause the toothed wheel 12 to axially move to the right overcoming the force of spring 13. Then the spline 12a of the toothed wheel 12 is engaged with the spline 23a of the main body 23 to rotate the main body 23 and wheel hub 20 integrally with the wheel 12 and inner race 11. Thus the four-wheel drive may be available.

Under this four-wheel drive condition, since the shoe 14 is frictionally engaged with the support member 33 to retard its rotation with respect to the rotation of the toothed wheel 12, the rightward displaced position of the wheel 12 is maintained.

Further, when the vehicle is converted from the four-wheel drive condition to the two-wheel drive condition, the wheel 12 will be forced to move to the original position (the position of FIG. 1) by the force of spring 13. Thus the main body 23 is freely rotatable due to the disengagement of the splines between toothed wheel and the main body.

Figure 5:
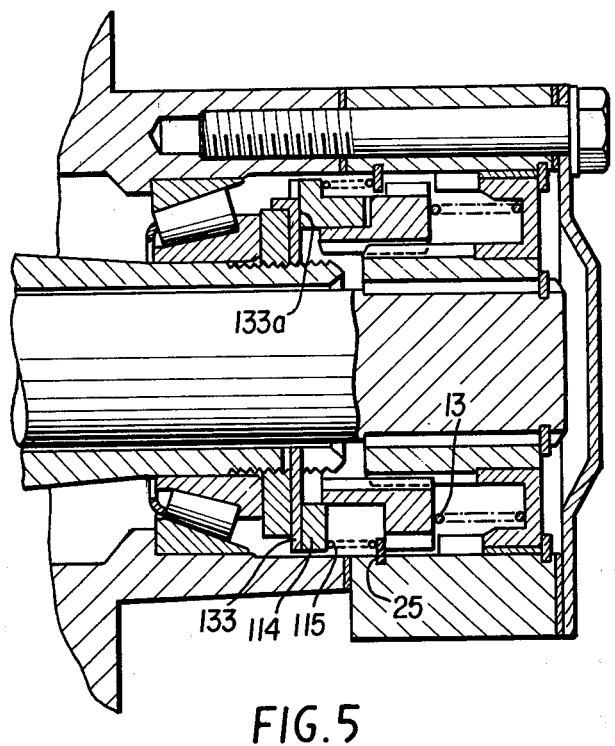
FIG. 5 is a vertical sectional view of the second embodiment.

In the embodiment of FIG. 5, the shoe 114 has no slit and is in slidable contact with an annular guide surface 133a of a support member 133 through a biasing force of coil spring 115. Under such a construction, the effective sliding area of the shoe 114 is larger than that of the previous embodiment and accordingly, the biasing force of spring 115 may be designed to be smaller, which will prevent the shoe 114 from having excess wear. Further, the coil spring 115 and clip 25 may be omitted from the assembly only if the force of spring 13 is strengthened enough to pressurize the shoe 114 upon the guide surface 133a of the support member.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A free wheel hub device comprising:
    a main body secured to a wheel;
    an inner race secured to a wheel axle and rotatably supporting said main body at an outer peripheral portion of said inner race;
    a toothed wheel axially movably mounted on said inner race and having a cam face and outer teeth engageable with inner teeth of said main body;
    a spring means disposed between said inner race and said toothed wheel for disengaging said toothed wheel from said inner teeth of said main body upon non-rotation of said wheel axle;
    a support member secured to a wheel axle tube operatively connected to said wheel axle; and
    a shoe disposed between said toothed wheel and said support member and having a cam face for engaging with said cam face of said toothed wheel, said shoe being rotatable on a guide surface provided on said support member, whereby upon engagement of said cam faces of said toothed wheel and said shoe said outer teeth of said toothed wheel are engaged with said inner teeth of said main body by overcoming the force of said spring means to thereby slidably rotate said shoe upon said guide surface of said support member.

2. A free wheel hub device according to claim 1, wherein said wheel axle tube is rotatably mounted on said wheel.

3. A free wheel hub device according to claim 2, wherein said inner race is splined to said wheel axle for unitary rotation.

4. A free wheel hub device according to claim 3, wherein said inner race is splined to the inner teeth of said toothed wheel for allowing axial displacement of the latter with respect to the former but restricting the relative rotation therebetween.

* * * * *